H. L. PITMAN.
COMBINED TYPEWRITING AND COMPUTING MACHINE.
APPLICATION FILED JULY 19, 1917.
1,349,386.
Patented Aug. 10, 1920.
4 SHEETS—SHEET 4.
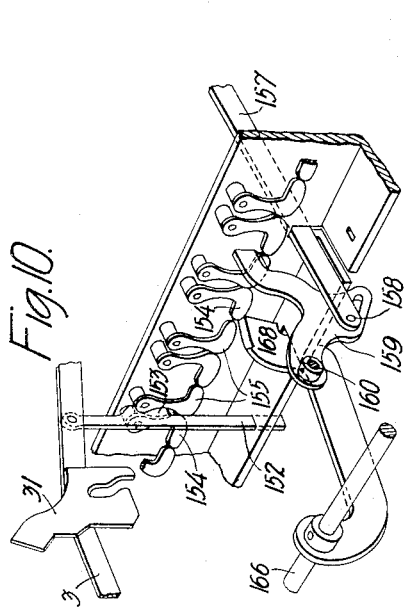
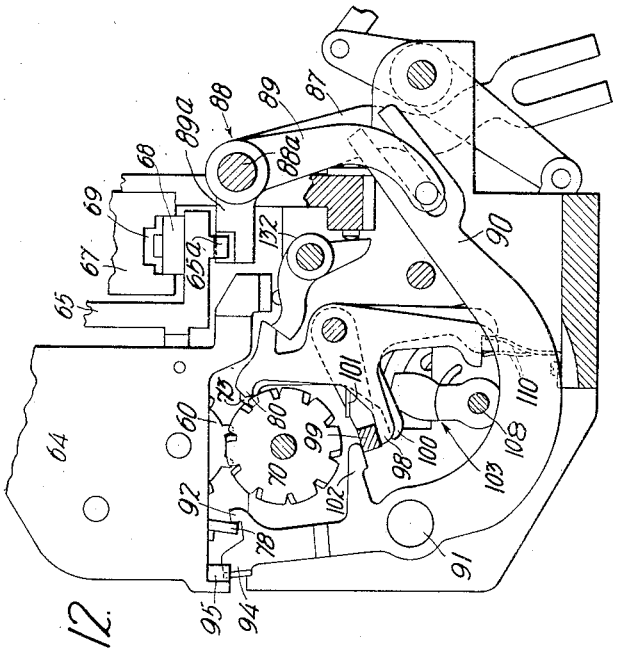
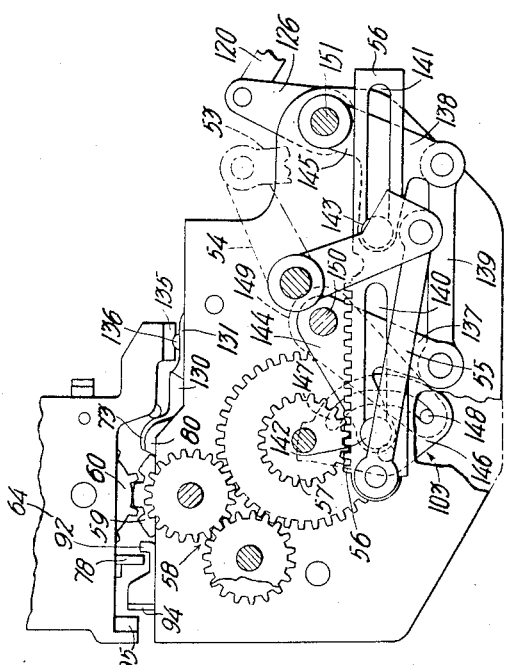
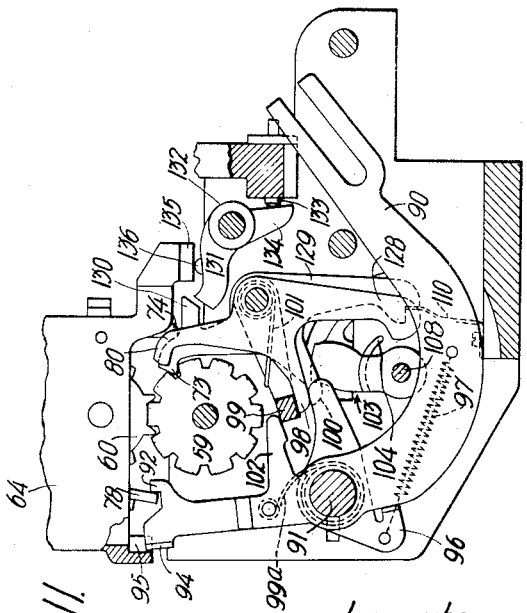

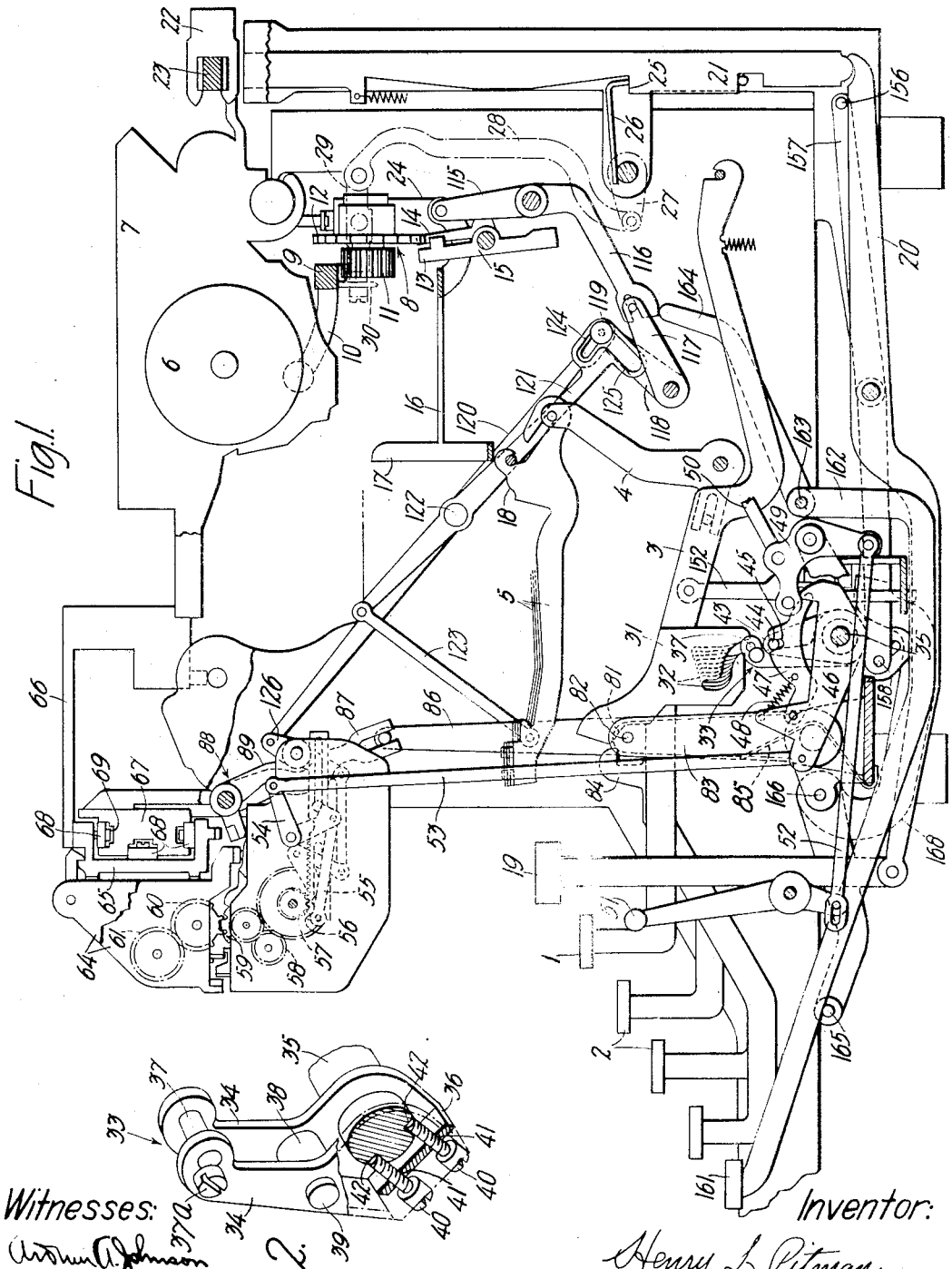

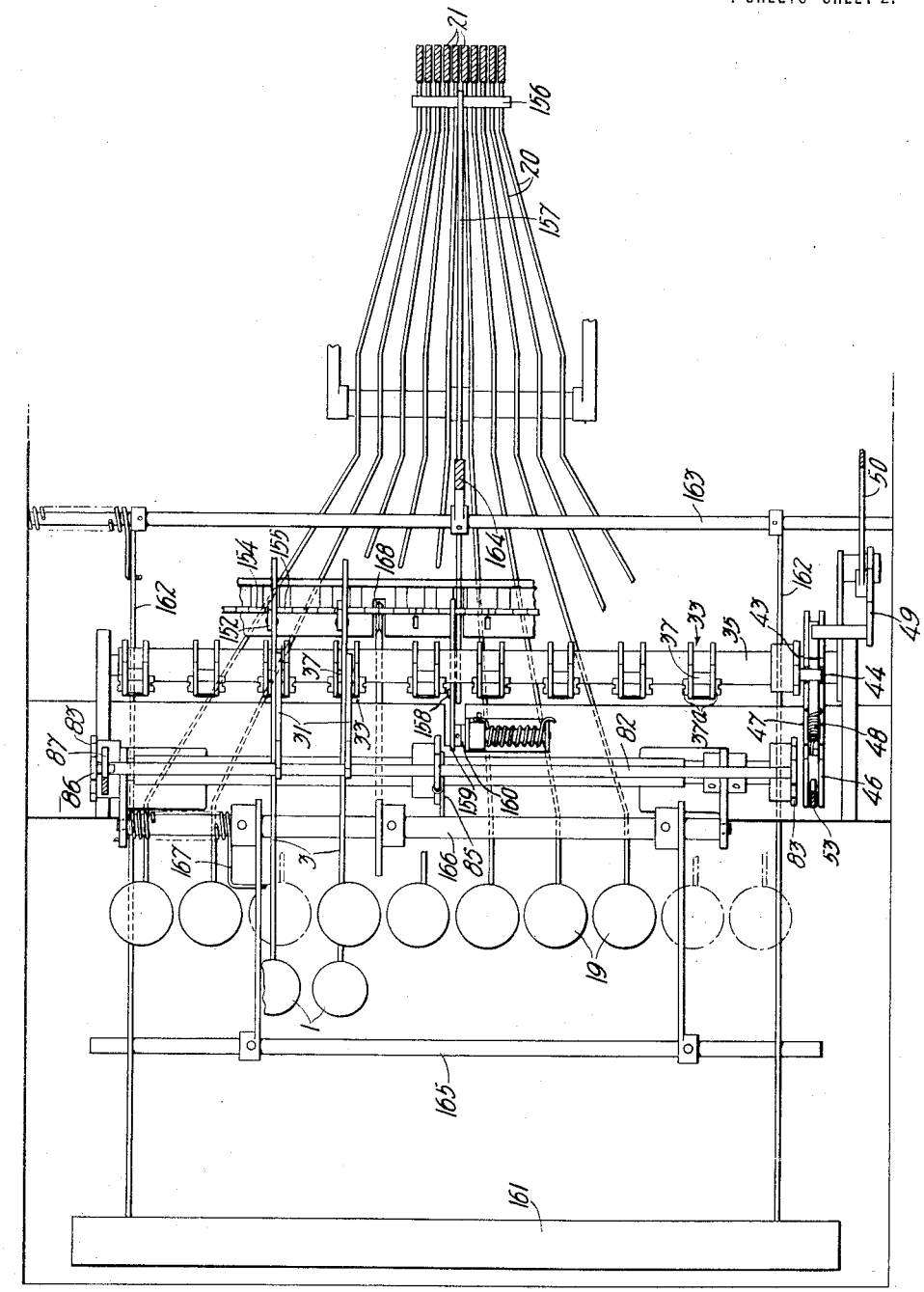

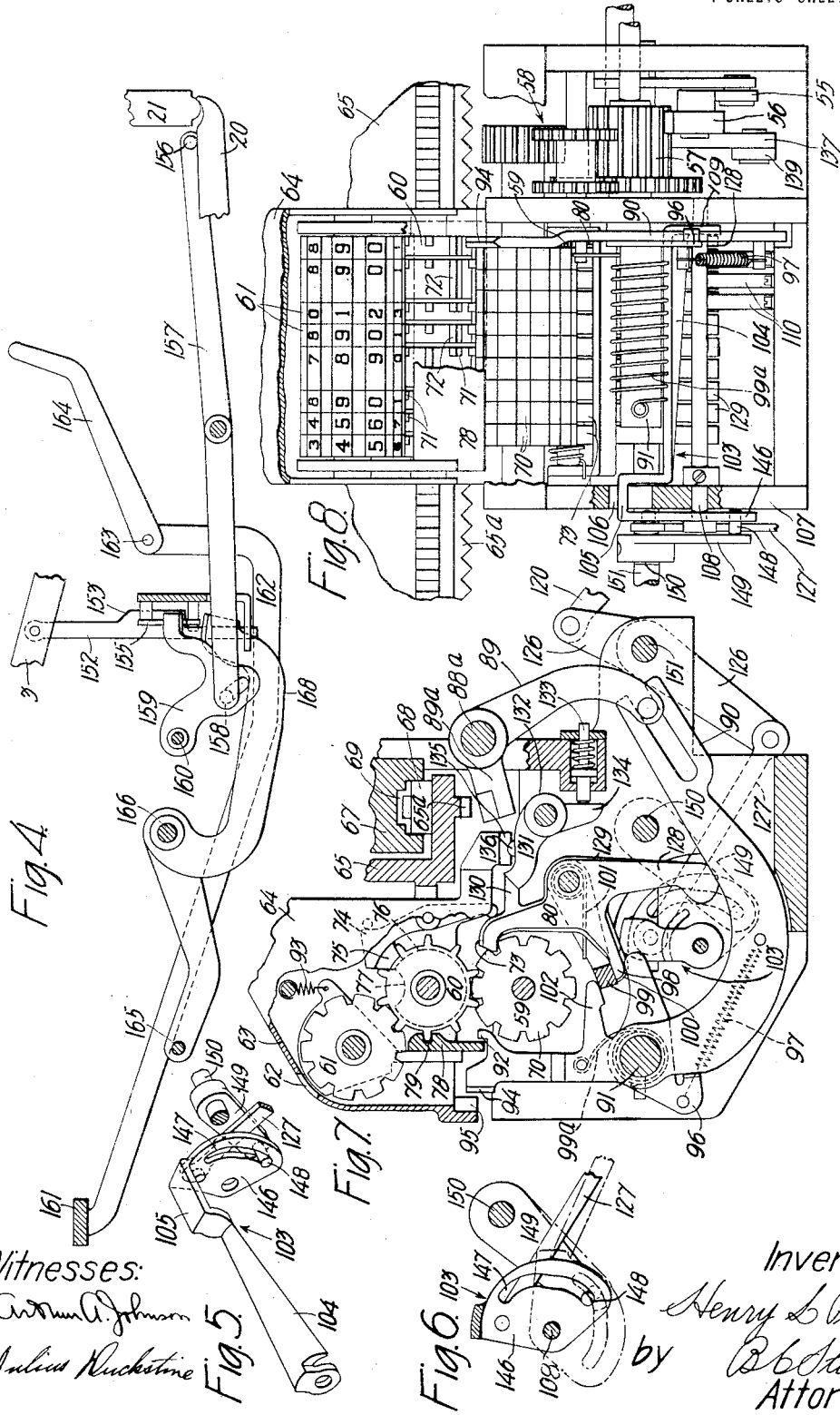

UNITED STATES PATENT OFFICE.

HENRY L. PITMAN, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,349,386.          Specification of Letters Patent.      Patented Aug. 10, 1920.

Application filed July 19, 1917. Serial No. 181,460.

*To all whom it may concern:*

Be it known that I, HENRY L. PITMAN, a citizen of the United States, residing in Brooklyn borough, in the county of Kings, city and State of New York, have invented certain new and useful Improvements in Combined Typewriting and Computing Machines, of which the following is a specification.

This invention relates to an improvement in combined typewriting and computing machines, and discloses improvements on my application No. 24,390, filed April 28, 1915, now Patent Number 1,308,506, dated July 1, 1919, and on the application of Frederick A. Hart, No. 70,898, filed January 8, 1916, now Patent No. 1,285,150, dated November 19, 1918.

In said applications and others, each numeral key, in addition to operating the usual type-action, carries a slotted cam, which has a curvature whose throw corresponds to the value of the key. This cam operates a master wheel through suitable mechanism, including a train of gearing.

In the present case, the slotted cams actuate individual bails, which, in turn, operate the actuating mechanism and a train of gearing. These bails may be individually adjusted, so as to accurately locate them in the first instance, and also so that there may be taken up any wear that may occur in the course of time.

The master wheel, with the aid of carry-over wheels, drives computing and dial wheels to exhibit the numbers computed. It is found that the master wheel, through friction and its rapid action, is liable to displace the adjacent carry-over wheels; hence provision is made in the present invention to detain the three nearest carry-over wheels from accidental displacement.

In case any carry-over wheels should be displaced, provision is made to prevent the usual relative step-by-step movement between the master wheel and the computing wheels which are carried in this instance by the carriage. In this way liability of stripping of the teeth and mutilation of other parts is avoided.

Alining means is provided for the master wheel and also for the carry-over wheel detents, thus insuring proper engagement with the master wheel and the carry-over wheel.

Various improvements in details, such as the locking and unlocking of the traveling element of the computing mechanism at the proper time, the operation of the various detents, and the locking of the numeral keys, when computing is not desired for various reasons, are also provided for.

Other features and advantages will hereinafter appear.

In the accompanying drawings,

Figure 1 is a vertical section, taken from front to rear, with parts omitted to simplify the showing.

Fig. 2 is a detail perspective view, enlarged to show one of the individual bails operated by the cam on the associated numeral key.

Fig. 3 is a horizontal section, showing the tabulating key mechanism and the series of individual bails operated by the numeral keys.

Fig. 4 is a detail view in vertical section, taken from front to rear, showing the locking of the numeral keys from the tabulating keys and the space key.

Fig. 5 is a detail perspective view of the alining member for the master wheel and carry-over wheel detents.

Fig. 6 is a vertical section through the detent aliner shown in Fig. 5.

Fig. 7 is a vertical section through the computing mechanism at the totalizer or computing head, and illustrates the parts in a normal non-computing relation before the numeral key has been struck.

Fig. 8 is a front view, in elevation of Fig. 7, showing the relation of the driving mechanism to the computing and dial wheels, and also the relation of the carry-over wheels thereto.

Fig. 9 is a detail view in vertical section, taken from front to rear, of the driving mechanism for the master wheel.

Fig. 10 is a detail perspective view of the numeral-key-locking mechanism, showing the special locks operated from the tabulating keys and the space bar.

Fig. 11 is a detail view, partly in section, taken from front to rear, showing how the detent for the master wheel is thrown out and held in this position while the master wheel is rotating, and also how the locking of the totalizer or computing head against traveling movement, with a release of the lock for the computing and dial wheels, is accomplished.

Fig. 12 is a view similar to Fig. 11, except that it is taken in section adjacent one of the carry-over wheels, and illustrates how the carriage is locked against traveling movement when one of the carry-over wheels is out of alinement.

Numeral keys 1 and alphabet keys 2 depress key levers 3 and rock bell cranks 4, so as to swing type-bars 5 up rearwardly against the front side of the platen 6, mounted to rotate on a carriage 7. The carriage 7 has the usual step-by-step letter-feeding movement under the control of an escapement mechanism indicated in general at 8.

This escapement mechanism, briefly described, includes a rack bar 9, swingingly mounted on the carriage 7, by means of arms 10, so as to be adjustable into and out of engagement with a pinion 11. Normally the rack bar 9 is in engagement with the pinion 11, and the latter is controlled in its rotation by an escapement wheel 12 connected thereto by a one-way pawl-and-ratchet mechanism, (not shown). The escapment wheel 12 is controlled by fast and loose dogs 13 and 14 carried on a rock frame 15, which is operated by a universal frame 16. The universal frame 16 has a universal bail 17 engaged by each and every one of the type-bars 5, each of which has a heel 18 for this purpose. This is the usual Underwood escapement mechanism and enables the carriage 7 to travel step by step at the striking of each of the numeral and alphabet keys.

In addition to having the step-by-step movement, the carriage 7 may have major or jump movements. For this purpose, there is provided a tabulating mechanism including tabulating keys 19. The tabulating keys 19, when depressed, rock key levers 20 to raise at their rear ends plungers 21 into the path of a stop 22 adjustably mounted on a rack bar 23 carried by the carriage 7. Each of the plungers 21, when operated by its associated tabulating key 19 releases the carriage 7 from the escapement mechanism, so as to permit it to move forward under the traction of a spring barrel 24. For this purpose, each of the plungers 21 is provided with shoulder 25, arranged to engage an arm 26, universal to all of the shoulders and forming part of a rock lever 27. The rock lever 27, when actuated, draws down on a link 28, so as to rock a lever 29, carrying at its forward end a roller 30, underlying the rack bar 9. In this way, the rack bar 9 is disengaged from the pinion 11, permitting the carriage 7 to jump forward until the next stop 22 engages the projected plunger 21 determining the position of the carriage.

This tabulating mechanism is part of the usual Underwood typewriter, but it is described inasmuch as its action must be considered in relation to the computing mechanism.

In addition to typewriting, the numeral keys 1 perform computing operations. For this purpose, each of the numeral keys is provided with a valuating or indexing member 31 shown in the form of a plate having a cam slot 32. The throw or pitch of the cams formed by the slots 32 varies according to the values of the associated numeral keys. That is to say, for the "1" numeral key the throw is least and increases by a regular increment to a maximum for the "9" numeral key. The series of cams thus forms a graded set of valuating elements.

Each of the indexing or valuating members 31 is arranged to engage and operate an individual bail 33, Fig. 2. The bail, in each instance, consists of a pair of arms 34 slipped onto a shaft 35. The arms 34 are connected as a unit by a spacing member or cross-bar 36 adjacent the shaft 35, and support at their upper ends a cross-bar 37, in the form of a roller, held against lateral displacement by screw heads 37$^a$, which overlap the ends of the cross-bar. The roller 37 forms a follower which engages the cam surface of the slot 32 and enables the bail 33 to be rocked back and forth. In addition to the spacing member just mentioned, a spacing member, intermediate the ends of the bail, is provided, comprising a collar 38 encircling a connecting piece 39 and preventing movement of the arms 34 toward each other.

In order to properly adjust the bail 33 with respect to its cam plate 31, in the first instance, and later in case it is desired to take up wear, there is provided a pair of set screws 40. These set screws are located in the screw-threaded openings 41 in the crossbar 36, and engage at their free ends with shoulders 42 formed in the shaft 35. Thus, by tightening up one set screw and loosening the other set screw, the position of the bail and its follower 37 can be very accurately adjusted.

Secured to the shaft 35, which is universal to all of the bails 33, there is provided an arm 43, Fig. 1, which forms a means of connection between the valuating or indexing mechanism comprising the bails and cam plates and the rest of the computing mechanism.

For this purpose, the arm 43 is provided with a pin 44, which, when computing, is located in a socket 45 provided in the floating interponent 47. The actuator 46 may be disconnected from the arm 43, so as to silence the computing mechanism, by depressing the floating interponent 47, forming the direct engaging element of the actuator with the pin 44, until it is free and clear of the arm 43. This is done against the tension of a spring 48, in a manner more fully explained in the above-mentioned Hart application. One way of silencing this mechanism is by a disconnector 49, which depresses the interponent 47 against the tension of its spring 48. The disconnector 49 is operated in a manner more fully described in the above-mentioned applications from the case-shift mechanism, by means of a link indicated at 50. The disconnector is also operated from a hand-lever 51 through the intermediary of a link 52.

When computing, however, the interponent 47 is in its raised position, so as to form a rigid connection between the series of valuating or indexing bails and the actuator 46, so that this actuator will be oscillated amounts corresponding to the value of the actuated numeral key. During the downstroke of the numeral key, the actuator 46 draws down on a link 53, to rock a bell crank 54, so as to thrust forwardly on a link 55 which is connected to advance a driving rack bar 56. The driving rack bar 56 rotates a pinion 57, which, in turn, through a train of gearing 58, Figs. 1 and 8, drives a master wheel 59, Fig. 7. The master wheel 59 drives one by one a row of computing wheels 60, which, in turn, drive dial wheels 61, so that the result of the computation can be exhibited through a sight-opening 62 in the casing 63 by one or more totalizers or computing heads 64.

In the present instance, the computing head or totalizer 64 travels to effect the relative step-by-step movement between the master wheel 59 and the computing wheels 60 and the dial wheels 61, so as to bring about the individual driving action of the master wheel. For this purpose, the totalizers 64 are adjustably mounted on a truck 65 secured to the carriage 7, by means of a connection 66. The truck 65 may be mounted for a sliding movement on a fixed rail 67 in any suitable manner, such as by means of rollers 68, engaging in track grooves 69.

When the dial wheel 61 and its associated computing wheel 60 complete a revolution, so as to bring "0" to the sight-opening 62, "1" is carried to the next higher computing wheel and thus to the next higher dial wheel. For this purpose, there are provided a series of carry-over wheels 70, Figs. 8 and 12. These carry-over wheels 70 are staggered relatively to the computing wheels 60, and broad enough to overlap a series of teeth 71, forming a complete gear on the higher computing wheels of the two which it bridges, and a broad tooth 72 on the lower of the computing wheels of the two which it bridges. The broad tooth 72 or the carry-over occurs once on each computing wheel. This broad tooth is so located that it will drive the associated carry-over wheel when its dial wheel 61 brings "0" to the sight-opening 62. Normally a detent 73 locks each carry-over wheel 70 against rotation. The carry-over wheel meshes with the complete gear 71 and the next higher computing wheel, and drives it one-tenth of a revolution.

This detent 73, in each instance, is controlled from the associated computing wheel 60 in register therewith at any particular time, by means of a lever 74 provided with a follower 75, riding on a cylindrical surface 76 formed on each of the computing wheels 60. The hub forming this cylindrical surface 76 is provided with a dip 77 so located that when the associated dial wheel brings "0" to the sight-opening, this depression will come into register with the follower 75, permitting it to drop, thereby releasing the carry-over detent, which will permit the broad carry-over tooth 72 coming around at this time, to locate the carry-over wheel. This carry-over mechanism, as so far described, is more fully covered in my said prior application.

When numeral keys are not actuated to compute, the computing wheels 60 are locked against rotation by a bar 78 pivotally supported on the dial wheel shaft and having a slot 79 to engage with a series of teeth on the computing wheels 60. The carry-over wheels 70 are locked as above described, and the master wheel 59 is locked by a detent 80.

The detents 73 for the computing wheels and the detent 80 for the master wheel are released when a computing action takes place. The valuating or indexing plates 31 control this indirectly. For this purpose, each of the valuating plates 31 is provided with a cam 81, which, as a numeral key is depressed, engages a rod 82 of a bail 83. This rod and bail are locking means for the alphabet keys, and the rod 82 is forced under hooks 84 provided on each of the alphabet keys. A return spring 85 is provided for the bail 83, and is connected to the middle one of three arms forming part of the bail 83.

One arm of the bail 83 is provided with an extension 86, engaging an arm 87 (Figs. 1 and 12) of a bell-crank 88 comprising a rock shaft 88$^a$. One arm 89 of this bell-crank 88 has a pin-and-slot engagement with a lever 90, pivoted on a shaft 91. The lever 90 is provided at its upper end with a lug 92, arranged to shift the locking bar 78 against the tension of its spring 93, out of engagement with the series of computing wheels 60. The lever 90 is also provided with a locking dog 94, arranged to come between the teeth of a rack 95, provided at computing wheel intervals on the totalizer 64. On the rock shaft 88$^a$ is mounted another locking dog 89$^a$ arranged to engage between tapered teeth of a rack 65ª on the lower side of said totalizer truck 65. Thus, the computing wheels are automatically unlocked, and the totalizer and the totalizer truck are locked. The lever 90 also unlocks the detent 80 from the master wheel 59. For this purpose, there is provided a floating lever 96, pivotally mounted on the shaft 91, and yieldingly connected to move with the lever 90 by means of a spring 97. One arm of the lever 96 engages under an arm 98, provided on the master-wheel detent 80. The action is such that the detent 80 is forced out of engagement with the master wheel, as the numeral key starts to drive the master wheel, and is held out of engagement with the master wheel while it is being rotated. During the return movement of the numeral key, the detents 73 and 80 are restored to their locking positions by the lever 90, which is actuated by a coil spring 99ª.

If the detent 80 for the master wheel, or any of the detents 73 for the tens-carrying wheels, should happen to be out of proper engagement with their wheels and riding on the apices of the teeth, then the computing head 64, and thus the typewriter carriage 7, will be locked against traveling movement. For this purpose a bail 99 overlies arms 100 and 98 on the detents 73 and 80, respectively. When any of these detents happen to be misplaced, then the bail 99 is raised against the tension of a spring 101, so as to raise an arm 102 on the lever 90, locking the latter against the tension of its spring, so as to force the dog 94 into engagement with the rack 95, and the dog 89ª into engagement with the rack 65ª.

To realine the carry-over wheels and force the master-wheel detent into engagement with the master wheel, there is provided an aliner 103, Figs. 5, 6 and 7. The aliner 103 is in the form of a bail, stamped out of a single piece of sheet-metal, and includes a portion of a circular cylindrical surface having an inclined alining edge 104, sloping gradually from the master-wheel detent, through the series of tens-carrying detents, up to the one of highest denomination, where the aliner is of minimum magnitude. From this point, the aliner arches out at a point 105 and passes through an opening 106 in the casing 107. The aliner is pivoted on a shaft 108 at this point, outside the casing 107, and also on the same shaft inside the casing at 109.

The aliner 103 is manipulated from the letter-space mechanism, so as to come into play at the termination of the down-stroke of a numeral key when the computing action finishes. At this time lever 90 is still in locking position and the effect of alining the detents, including that for the master wheel 59, is to shift floating lever 96 with reference to lever 90. It is evident that the action of these parts at the end of the key stroke is made possible by the spring connection between levers 96 and 90. Incidentally, the driving rack 56 is shifted out of engagement with the pinion 57, which it drives, at the same time.

Considering these two features, the universal frame 16 is mounted on a rock-frame 115, which has a downwardly and forwardly projecting arm 116, engaging an arm 117 of a bell-crank. This bell-crank is rocked in a counter-clockwise direction at the rear stroke of a numeral key by the universal frame. The other arm 118, arranged at the left side of the machine, carries a pin 119, which forms, when computing, a rigid connection to a link 120. The rigidity of the connection is controlled by an interponent lever 121 pivoted at 122, and rocked at the actuation of a numeral key by a link 123, connected to be operated from the extension 86 of the bail 83, which, it will be remembered, was swung by the cams 81 whenever a numeral key was depressed. The lever 121 is provided with an L-slot, which has a passive section 124, in which the pin 119 vibrates idly when the alphabet keys 2 are operated. When, however, a numeral key is operated, the lever 121, as above mentioned, is swung into alinement with the link 120, so as to bring the other portion 125 of the L-slot into register with the pin 119, when the lever 121 rigidly connects the link 120 with the bell-crank 117, 118. Thus, when a numeral key is actuated, at the final down-stroke of the latter, the universal escapement frame thrusts on the link 120 to rock a bell-crank 126. The bell-crank 126, Fig. 7, is connected by a link 127 to rock the aliner 103. The aliner 103 brings its inclined edge first into engagement with an arm 128 on the master-wheel detent 80, then into engagement with an arm 129 on the tens-carrying detent 73 of lowest denomination, and so on successively into engagement with like arms 129 on each of the carry-over detents. In this way, the detents are positively forced into action in succession, so that the master wheel and tens-carrying wheels are alined or justified in their positions. After each detent is cammed into its locking position, the aliner brings the cylindrical surface or dwell portion thereof in register with the arms 128 and 129, so as to clear the arms 128 and 129.

When the totalizer or computing head 64 is not in a computing zone, and the wheels thereof are not in register with the carry-over wheels and the tens-carrying wheels, the tens-carrying detents 73 are locked against dislodgment. For this purpose, each of the detents 73 is provided with an extension 130, engaged by one arm 131 of a pivoted obstructing dog 132. The extension 130 and the arm 131 form a lock which prevents the disengagement of the detent and the carry-over wheel. The locking position of arm 131 is such that it acts substantially as an abutment. The dog 132 is held in operation by a spring-pressed plunger 133, engaging the other arm 134 of the dog 132. When a totalizer comes into register with the master wheel and carry-over wheels, that is, when the mechanism is in a computing zone, a cam 135, carried by the totalizer, and of a length corresponding to the number of computing wheels, comes into engagement with a projection 136 on each of the dogs 132, so as to rock them successively about their pivots, and thus release the carry-over wheels as they come into register successively with the computing wheels. In this way, only such of the carry-over wheels as are needed will be unlocked for action, thereby maintaining the other carry-over wheels in proper alinement, so that they will mesh accurately with the computing wheels as the computing wheels advance step by step into register therewith.

Springs 110 (Fig. 12) are provided for the three carry-over wheel detents nearest the master wheel, to prevent the accidental disalinement of these wheels, due to the rapid rotation of the master wheel.

When each driving movement of the master wheel is completed, the drive rack bar 56 is disengaged from the pinion 57 for a return idle movement. For this purpose, the drive rack bar 56 is floatingly supported by means of a pair of swinging bell cranks 137 and 138. These bell cranks are connected to move in unison by a link 139, thus giving a parallel motion to the drive rack bar 56. The support of the rack bar 56 by the bell cranks 137 and 138 is such as to permit a longitudinal movement of the drive rack bar relative to the supporting bell cranks. For this purpose, the drive rack bar is provided with slots 140 and 141, which are engaged respectively by pins 142 and 143, provided on arms 144 and 145 of the bell cranks 137 and 138, respectively. The movement of the bell cranks is obtained indirectly from the escapement mechanism, and particularly from the universal frame of the escapement mechanism, which, it will be remembered, is rocked at the final portion of the down-stroke of the numeral key. This, as stated above, through the link 120, rocks the bell crank 126, which, through the link 127, rocks the tens-carrying detent aliner 103. This aliner is provided on one of its sides with an enlargement 146, (Figs. 5 and 6), to form a plate having a cam slot 147 therein. A pin 148 rides in this slot and is mounted on an arm 149, secured to a shaft 150. The shaft 150 has also secured thereto the bell crank 137. In this way, the driving rack bar 56 is disconnected from the pinion 57, so as to idly move with the return movement of the actuated numeral key. It will be noted in passing that the other bell crank 138 is not rigid with the bell crank 126, although they are mounted on the same shaft 151.

Provision is made for locking the numeral keys from operating at times when their action would interfere with the operation of the rest of the mechanism. For this purpose, each of the numeral keys is provided with a depending plunger 152, Figs. 4 and 10, each of which has a crowding wedge 153. When a numeral key is depressed, the associated wedge 153 is forced in between two depending hangers 154 and 155. These hangers are arranged in pairs, and also in a continuous series, as explained in the above-mentioned applications. Just sufficient space is left in the group of hangers to permit the intrusion of a single wedge 153, so that when one numeral key is actuated, no other numeral key can be depressed far enough to have its computing and typewriting action take place, as the other depending hangers will be jammed tight together, preventing such intrusion.

When tabulating, that is, when any of the tabulating keys 19 is operated to jump the carriage from one computing zone to another computing zone, provision is made for locking the numeral keys, as their action at this time would be improper. For this purpose, there overlies the group of tabulating key-levers 20 at their rear ends, Figs. 1 and 3, a bar 156, so as to be universal to all of them, and operated by any of them. The bar 156 is mounted on a lever 157 of the first order, pivoted intermediate its ends, and having a pin-and-slot connection 158 with an intruding dog 159, swingingly mounted by means of a shaft 160. When any of the tabulating keys is operated, it will swing this dog 159 downwardly, so as to cam it in between two of the hangers 155 and 154. In this way, the amount of lost-motion in the series of hangers is taken up, thereby leaving no room for any of the wedges 153 to crowd into the series. In this way, all of the numeral keys are locked when tabulating, and conversely the tabulating keys are locked when a numeral key is depressed.

Further provision is made for locking the numeral keys when spacing the typewriter carriage 7 by means of the usual space-bar 161. The space-bar 161 forms part of a frame 162, swinging about a pivot 163 and having an arm 164 to engage and operate the arm 116 of the escapement rock frame 115. In this way, the escapement mechanism is operated one step to permit the carriage 7 to advance a single step. The space-bar frame 162, Figs. 3 and 4, overlies a bail 165, secured to a shaft 166 and normally held in a raised position by a spring 167.

The shaft 166 also has secured thereto a crowding dog 168, Figs. 4 and 10. This dog 168, when the space-bar is actuated, is forced up between two of the locking hangers 155 and 154, so as to take up what little space there is in the series, thereby preventing any of the wedges 153 for the numeral keys from intruding between their associated pairs of hanging locks. In this way, again, the numeral keys are prevented from operation when the carriage is being spaced by the space-bar. Conversely the space-bar is locked when a numeral key is depressed.

Variations may be resorted to within the scope of the invention, and portions of the improvements may be used without others.

Having thus described my invention, I claim:

1. The combination with a series of computing wheels, of a master wheel for driving said computing wheels *seriatim*, a series of carry-over wheels for said computing wheels, detents for said carry-over wheels, a detent for said master wheel, said detents each having an arm engaging its associated wheel and another arm, and an aliner for said wheels acting on said second arm and comprising a bail having a diagonal edge to operate said detents in succession.

2. The combination with a series of computing wheels, of a master wheel for driving said computing wheels one by one, a series of carry-over wheels for said computing wheels, detents for said master wheel and said carry-over wheels, escapement mechanism for controlling a relative step-by-step movement between said computing wheels and said master wheel, numeral keys connected to drive said master wheel and operate said escapement mechanism, and an aliner for said master and carry-over wheels operated from said escapement mechanism when the driving action of said numeral keys on said master wheel is completed, to shift said detents one by one into justifying relation with their associated wheels.

3. The combination with a series of computing wheels, of a master wheel for driving said computing wheels one by one, a detent for said master wheel, carry-over wheels for said computing wheels, a series of detents one for each of said carry-over wheels, a positive alining means for said carry-over and master wheels universal to all of said detents and acting directly thereon, and spring-justifying means for a few of the carry-over wheels nearest the master wheel to take care of any tendency of the master wheel to disaline these carry-over wheels.

4. The combination with a series of computing wheels, of a master wheel for driving said computing wheels one by one, a series of carry-over wheels for said computing wheels, individual detents for said master wheel and said carry-over wheels, positive means for holding said carry-over wheels locked, when not computing, by rigidly engaging with said detents, said positive means being withdrawn to a position clear of said detents when driving said master wheel, and impositive means for the detents of the few carry-over wheels nearest to said master wheel and liable to be accidentally rotated, thereby holding such computing wheels against accidental disalinement.

5. The combination with a series of computing wheels, of a master wheel for driving said computing wheels one by one, a carriage traveling to effect a step-by-step movement between said computing wheels and said master wheel, enabling the individual successive drive of said computing wheels by said master wheel, a lock for said computing wheels, a releasing lever for said lock having means to lock said carriage against a traveling movement, a detent for said master wheel, a floating lever for releasing said detent, and a spring connection between said floating lever and said first-mentioned lever to indirectly release said detent at the same time said carriage is locked and said computing wheels are unlocked.

6. The combination with a series of computing wheels, of a master wheel for driving said computing wheels one by one, means, including a carriage, for effecting relative step-by-step movement between said computing wheels and said master wheel, a detent for said master wheel to hold the same in justified position, a lock for said carriage, means for concomitantly releasing said detent and operating said lock to secure said carriage when said master wheel is being driven, and connections between said detent and said lock, whereby said master wheel at rest in unjustified position will act through its detent and said connections to hold said lock in operative position.

7. The combination with a series of numeral keys of different values, of key levers on each of which is mounted a numeral key, a camming member individual to each key lever and mounted thereon having an effective throw corresponding to the value of its key, a bail individual to each camming member, so as to be operated thereby, and a rock shaft universal to all of said bails secured thereto to be driven an amount corresponding to the particular numeral key actuated at any time.

8. The combination with a series of numeral keys of different values, of key levers on each of which is mounted a numeral key, a camming member individual to each key lever and mounted thereon having an effective throw corresponding to the value of its key, a shaft to be driven by said key, a series of arms secured to said shaft in pairs, and a cross bar connecting each pair and forming a follower to engage one of said camming members so as to be driven thereby an amount corresponding to the numeral key actuated to drive said shaft accordingly.

9. In combination, a traveling element, an escapement feed therefor, numeral-key-actuated means for controlling said escapement feed, and numeral-key-actuated means to lock said traveling element against movement, said locking means being rendered effective at the beginning of the down-stroke of a numeral key and so maintained until the termination of the return stroke of said key.

10. In combination, a totalizer, a truck on which said totalizer is adjustably mounted, feeding means for said truck, numeral-key-actuated locking means for said truck rendered effective at the beginning of the down-stroke of a numeral key and so maintained until the termination of the return stroke, and totalizer-locking means, actuated by said truck-locking means and effective at the same time, to prevent displacement of said totalizer in the direction of its feed.

11. The combination with a series of numeral keys having different values, of a cam member for each numeral key rigidly connected thereto and having a throw corresponding to the value of its key, a bail individual to each of said cam members and keys, each of said bails having a follower to engage the associated cam member, a shaft extending through openings in said bails, said shaft having a pair of shoulders for each of said bails, and a pair of set screws screwed into each of said bails and engaging said shoulders arranged to be alternately tightened and loosened so as to accurately adjust the position of each bail relative to said shaft and to the associated cam members.

12. A valuating or indexing unit comprising a cam and a bail driven by said cam, said bail including a pair of arms, a cross-bar connecting said arms, a follower roller engaging said cam, and mounted in openings in said arms, means to prevent longitudinal movement of said follower roller in said arms, and a spacing member intermediate said arms, and also intermediate said follower roller and said cross bar.

13. The combination with a driving rack bar, of a pinion driven by said rack bar, a parallel linkage for shifting said driving rack bar into and out of engagement with said pinion, an arm connected to said parallel linkage, a pin on said arm, a plate having a cam slot therein for shifting said pin, and means for swinging said plate.

14. The combination with computing wheels, of a master wheel for driving said computing wheels, tens-carrying wheels for said computing wheels, detents for certain of said wheels, a bail having an alining portion coöperating with said detents, and having an enlarged side to form a camming plate, a rack bar for driving said master wheel, and connections, operated from said camming plate, for shifting said rack bar between effective and ineffective driving positions.

15. The combination with computing wheels, of carry-over wheels for certain of said computing wheels, detents for said carry-over wheels, spring-actuated dogs for holding said detents in play, an aliner for forcing said detents into action, and springs for yieldingly forcing certain of said detents into engagement with their carry-over wheels.

16. The combination with computing wheels, of carry-over wheels for said computing wheels, detents for said carry-over wheels, extensions on said detents, dogs engaging said extensions, a lock for preventing a relative movement between said carry-over wheels and said computing wheels, arms on said detents connected to operate said lock, an aliner for said detents, arms on said detents lying in the path of said aliner, and springs connected to the last-mentioned arms on some of said detents.

17. In a combined typewriting and computing machine, the combination of a traveling carriage, an escapement mechanism therefor, numeral-key actuated locking means engaging with said carriage and preventing movement thereof during the down and return strokes of a numeral key, and means for preventing the actuation of said carriage by the actuation of any other key, during the actuation of said numeral key.

18. In a combined typewriting and computing machine, the combination of computing mechanism, a space-key, numeral and alphabet keys, said numeral keys controlling said computing mechanism, a traveling carriage, an escapement mechanism for said carriage under the control of any of the above-mentioned keys, means, including tabulator keys, for causing letter-feed movements of the carriage independent of the escapement mechanism, numeral-key-actuated locking means for said carriage effective from the beginning of the down-stroke until the termination of the return stroke of any of said numeral keys, and mechanism actuated by any of said numeral keys for preventing the depression of any other of said keys.

19. In a combined typewriting and computing machine, the combination of computing mechanism, a space-key, tabulator keys, alphabet keys, numeral keys controlling said computing mechanism, a traveling carriage, an escapement mechanism for said carriage under the control of said alphabet keys, said numeral keys, and said space-key, tabulating mechanism controlling the movements of said carriage, numeral-key-actuated means for preventing the actuation of the alphabet keys, and a numeral-key-actuated device for preventing actuation of the space-key and tabulator keys.

20. In a combined typewriting and computing machine, the combination of computing mechanism, a traveling carriage, carriage-controlling means including a space-key, tabulator keys and numeral keys, said computing mechanism being controlled by said numeral keys, and a device for preventing the space-key and tabulator keys from controlling said carriage, during the actuation of a numeral key and for preventing the numeral keys from controlling said carriage during the movement of the space-key or that of the tabulator keys.

21. In a combined typewriting and computing machine, the combination of computing mechanism, a traveling carriage, an escapement therefor, escapement-controlling means including a space-key and numeral keys, numeral-key-actuated means for controlling the computing mechanism, tabulating mechanism for controlling said carriage including tabulator keys, a device for preventing simultaneous depression of two numeral keys, and means brought into action by a tabulator key for preventing the operation of any numeral key or the space-key, said last mentioned means acting through the medium of said preventing device.

22. In a combined typewriting and computing machine, the combination of computing mechanism, a traveling carriage, an escapement therefor, escapement-controlling means including a space-key and numeral keys, numeral-key-actuated means for controlling said computing mechanism, tabulating mechanism including tabulator keys, means for preventing simultaneous depression of two numeral keys, and devices brought into action respectively by either a tabulator key or the space-key for preventing the operation of any numeral key, said devices acting through the medium of said simultaneous-depression-preventing means.

23. In a combined typewriting and computing machine, the combination of computing mechanism, a traveling carriage, an escapement therefor, escapement-controlling means including a space-key and numeral keys, numeral-key-actuated means for controlling the computing mechanism, tabulating means, including tabulator keys also controlling said carriage, means for preventing simultaneous depression of two numeral keys, and devices connecting said tabulator keys and said space-key with said simultaneous-depression-preventing means, whereby depression of said space-key will prevent the depression of any other key.

24. In a combined typewriting and computing machine, the combination of computing mechanism, a traveling carriage, an escapement therefor, escapement-controlling means including a space-key and numeral keys, numeral-key-actuated means for effecting the operation of the computing mechanism, means including a series of hangers, for preventing simultaneous depression of two numeral keys, and devices, acting through the medium of said hangers, for preventing the operation of any numeral key or the space-key when a tabulator key is operated.

25. In a combined typewriting and computing machine, the combination of computing mechanism, a traveling carriage, an escapement therefor, numeral keys, numeral-key-actuated devices for controlling the computing mechanism and said carriage escapement, a space-key, means, including tabulator keys, for controlling said carriage, means including a series of hangers, for preventing simultaneous depression of two numeral keys or of a numeral key and the space-key, and means, acting through the medium of said hangers, for preventing the operation of any numeral key or the space-key when a tabulator key is operated.

26. In a combined typewriting and computing machine, the combination of computing mechanism, a traveling carriage, an escapement therefor, numeral keys, devices actuated by said numeral keys for controlling the computing mechanism and said carriage, a space-key, tabulating means, including tabulator keys, also controlling said carriage, means, including a series of hangers, for preventing simultaneous depression of two numeral keys or of a numeral key and the space-key, and means, acting through the medium of said hangers, for preventing the operation of any numeral key or the space-key when a tabulator key is operated, and vice versa.

27. In a combined typewriting and computing machine, the combination of computing mechanism, a traveling carriage, an escapement therefor, numeral keys, numeral-key-actuated devices for controlling the computing mechanism and said carriage escapement, a space-key, space-key-actuated means also controlling said carriage escapement, tabulating means, including tabulator keys, also controlling said carriage, a series of hangers, members individual to the numeral keys and the space-key and actuated thereby to be interposed between said hangers, to prevent the simultaneous depression of said keys, and means brought into operation by any tabulator key for interposing a member between said hangers, to prevent the operation of any numeral key or the space-key when the tabulator key is in depressed position.

28. In a combined typewriting and computing machine, the combination of computing mechanism, a traveling carriage, an escapement therefor, means for controlling the computing mechanism and said carriage escapement, including keys having connections with both the computing mechanism and the carriage escapement, means, including a space-key, also controlling said carriage escapement, tabulating means, including tabulator keys, also controlling said carriage, and a single means, having connections with all of said keys, for preventing the depression of any numeral key or the space-key when a tabulator-key is operated, and vice versa.

29. In a combined typewriting and computing machine, the combination of computing mechanism, a traveling carriage, an escapement therefor, means, including numeral keys, for controlling the computing mechanism and said carriage escapement, means, including a space-key, also controlling said carriage escapement, tabulating means, including tabulator keys, also controlling said carriage, and a locking device including a series of hangers, blocking members individual to each numeral key and the space-key and actuated thereby, to be interposed between said hangers, to prevent the simultaneous depression of two numeral keys or of a numeral key and the space-key, and a device, universal to said tabulator keys, and actuated thereby, including a blocking member to be interposed between said hangers to prevent the simultaneous depression of a tabulator key and either a numeral key or the space-key.

30. In a combined typewriting and computing machine, the combination of computing mechanism, tabulator keys, numeral keys controlling said computing mechanism, a traveling carriage, a numeral-key-controlled feed mechanism for said traveling carriage, means for preventing the numeral keys from controlling said feed mechanism brought into action by the operation of a tabulator key, said means comprising a member moved through the medium of a lever of the first order, by the tabulator key to render said preventing means effective.

31. In a combined typewriting and computing machine, the combination of computing mechanism, a space-key, tabulator keys, numeral keys controlling said computing mechanism, a traveling carriage, a feed device for said carriage controlled by said numeral keys and said space-key, and means brought into action by a tabulator key for preventing the numeral keys and space-key from controlling said carriage feed device, said means comprising a member moved by the tabulator key to render said preventing means effective.

32. In a combined typewriting and computing machine, the combination of computing mechanism, a traveling carriage, an escapement therefor, numeral keys, numeral-key-actuated devices for controlling the computing mechanism and said carriage escapement, tabulating means, including tabulator keys, also controlling said carriage, means for preventing the simultaneous depression of two numeral keys, and means brought into action by a tabulator key for preventing the operation of any numeral key, said means comprising a lever of the first order common to all the tabulator keys and adapted to actuate a dog, said dog acting through the medium of said first-mentioned means.

33. In a combined typewriting and computing machine, the combination of computing mechanism, a traveling carriage, an escapement therefor, means, including a space key, for controlling said escapement, numeral keys, numeral-key-actuated devices for controlling the computing mechanism and said carriage escapement, means, including tabulator keys for controlling said carriage, means for preventing simultaneous depression of two numeral keys, and means brought into action by a tabulator key for preventing the operation of the numeral keys and the space key, said means comprising a lever of the first order common to all the tabulator keys and arranged to actuate a dog, said dog acting through the medium of said first-mentioned means.

34. In a combined typewriting and computing machine, the combination of computing mechanism, a traveling carriage, an escapement therefor, numeral key actuated means for controlling the computing mechanism and said carriage escapement, tabulating means, including tabulator keys, also controlling said carriage, a key-locking device, including a series of hangers, for preventing simultaneous depression of two numeral keys, and means for preventing the operation of any numeral key when a tabulator key is operated, said means comprising a lever common to all the tabulator keys, and a dog actuated therefrom by a pin-and-cam-slot connection, said dog acting through the medium of said hangers.

35. In a combined typewriting and computing machine, the combination of computing mechanism, a traveling carriage, an escapement therefor, means for controlling the computing mechanism and said carriage escapement, including keys having connections with both, means, including a space key, for controlling said carriage escapement, tabulating devices, including tabulator keys, for controlling said carriage, key-locking means, including a series of hangers, for preventing the simultaneous depression of two numeral keys, or a numeral key and the space key, and means for preventing the operation of any numeral key or the space key when a tabulator key is operated, said means comprising a lever common to all the tabulator keys, and a dog actuated thereby, said dog acting through the medium of said hangers.

36. In a combined typewriting and computing machine, the combination of computing mechanism, a space key, tabulator keys, numeral keys controlling said computing mechanism, a traveling carriage, carriage-feeding means controlled by said space key, tabulator keys, and numeral keys, and means for preventing the numeral keys and tabulator keys from controlling said carriage brought into action by the operation of the space key, said means comprising a member moved by the space key to render said preventing means effective.

37. In a combined typewriting and computing machine, the combination with computing mechanism, of a traveling carriage, an escapement therefor, means, including numeral keys, tabulator keys, and a space key controlling said escapement, numeral-key-actuated means for controlling the computing mechanism, means for preventing the simultaneous depression of two numeral keys and the simultaneous depression of a numeral key and a tabulator key, and means brought into action by the space key for preventing the operation of the numeral keys and the tabulator keys, said means comprising a bail and a dog connected thereto, said dog acting through the medium of said first-mentioned means.

38. In a combined typewriting and computing machine, the combination with computing mechanism, of a traveling carriage, an escapement therefor, escapement-controlling means, including numeral keys and a space key, a numeral-key-control for said computing mechanism, tabulating means, including tabulator keys for controlling said carriage, means, including a series of hangers, for preventing the simultaneous depression of two numeral keys, or a numeral key and a tabulator key, and means for preventing the operation of any numeral key or tabulator key when the space key is operated, said means comprising a bail, a rock shaft, and a dog, said dog acting through the medium of said hangers.

39. In a combined typewriting and computing machine, the combination of alphabet and numeral keys, a totalizer, a truck on which said totalizer is adjustably mounted, feeding mechanism for said truck, numeral-key-actuated locking means for said truck, and means rendered effective by said truck-locking means to lock said alphabet keys.

40. In a combined typewriting and computing machine, the combination of alphabet and numeral keys, a totalizer, a truck on which said totalizer is adjustably mounted, feeding mechanism for said truck, locking means for preventing movement of said truck, locking means for preventing depression of any of said alphabet keys, a pivoted frame having parts to render said truck-locking means and said alphabet-key-locking means effective, and means whereby the depression of any of said numeral keys will cause said pivoted frame to move so as to render both of said locking means effective.

41. In a combined typewriting and computing machine, the combination of a space-bar, alphabet, numeral and tabulator keys, a traveling carriage, an escapement mechanism for said carriage connected with said space-bar, alphabet, numeral and tabulator keys, so as to be controlled thereby, numeral-key-actuated locking means for engaging with said carriage and preventing movement thereof during the operation of a numeral key, and mechanism whereby, during the operation of a numeral key, all other numeral keys, the alphabet keys, the space-bar, and the tabulator keys will be locked against operation.

42. In a combined typewriting and computing machine, the combination of computing mechanism, a space-key, numeral and alphabet keys, said numeral keys controlling said computing mechanism, a traveling carriage, an escapement mechanism for said carriage under the control of any of the above-mentioned keys, means, including tabulator keys, for causing movements of said carriage independently of the escapement mechanism, numeral-key-actuated locking means for said carriage effective from the beginning of the down-stroke until the end of the return-stroke of any of said numeral keys, means actuated by said carriage-locking means for preventing depression of any of said alphabet keys and numeral-key-actuated means for locking said tabulator keys against depression.

43. In a combined typewriting and computing machine, the combination of a totalizer, an escapement mechanism therefor, a master wheel to coöperate with said totalizer to effect computation, a totalizer-lock to prevent feeding movement thereof, master-wheel-driving means, including a pinion, a reciprocating rack-bar to engage therewith, and rack-bar-guiding means for effecting engagement and disengagement between said rack-bar and said pinion, a normally ineffective connection between said rack-bar-guiding means and said escapement mechanism, a swinging frame, connections between said frame and both the totalizer-lock and the connection between said rack-bar-guiding means and said escapement mechanism to render effective said totalizer-lock and said connection between the escapement mechanism and the rack-bar-guiding means, and means, including numeral keys, for actuating said swinging frame.

44. In a combined typewriting and computing machine, the combination of a totalizer, an escapement feed therefor, a master wheel to coöperate with said totalizer to effect computation, a totalizer-lock to prevent feeding movement of said totalizer, master-wheel-driving means, including a pinion, a reciprocating rack-bar to engage therewith, and rack-bar-guiding means for effecting engagement and disengagement between said rack-bar and said pinion, a normally ineffective connection between said rack-bar-guiding means and said escapement feed, alphabet keys, each carrying one element of an alphabet-key-locking device, a locking member supported for movement into position to engage with the locking elements on the alphabet keys, and connections between said locking member and both the totalizer-lock and the connection between said rack-bar-guiding means and said escapement feed, whereby movement of said locking member into locking position will render effective said totalizer-lock and said connection between the escapement feed and the rack-bar-guiding means.

45. In combination, a totalizer including computing wheels, a master wheel to actuate said computing wheels, feeding means to cause relative movement between said totalizer and said master wheel, a detent for said master wheel, means, including a locking lever, to prevent such relative movement between the totalizer and the master wheel, justifying means to press said detent into engagement with the master wheel and justify the same, a floating lever yieldingly connected to said locking lever to move therewith, and means whereby movement of said locking lever into operative position will cause said floating lever to withdraw said detent, and movement of said detent by said justifying means will cause said floating lever to yield with reference to said locking lever.

46. In combination, a totalizer including computing wheels, a master wheel to actuate said computing wheels, feeding means to cause relative movement between said totalizer and said master wheel, numeral keys, numeral-key-actuated locking mechanism to prevent relative movement between said totalizer and said master wheel, said locking mechanism being rendered effective at the beginning of the down-stroke of a numeral key and so maintained throughout the remainder of the stroke, a detent for said master wheel, a justifying device to press said detent into engagement with said master wheel at the end of the down-stroke of a numeral key, and yielding connections between said locking mechanism and said master wheel detent to effect withdrawal of said detent when said locking mechanism is rendered effective and to yield upon actuation of said detent by said justifying device.

47. In a computing machine, the combination with computing wheels and carry-over wheels therefor, of a master wheel for driving said computing wheels, feeding means to cause relative movement between said master wheel and said computing wheels, thereby enabling said master wheel to drive said computing wheels *seriatim*, detents severally engaging said carry-over wheels and said master wheel, locking means, effective during the operation of a numeral key, to prevent such relative movement between said master wheel and said computing wheels, a justifying device, rendered effective at the end of each master wheel actuation of a computing wheel, to press said detents against the carry-over wheels and master wheel respectively, to insure proper positioning of the same, and a yielding device, actuated by said locking means in its movement into operative position, to withdraw the detent from the master wheel and to yield upon engagement of this detent by the justifying device.

HENRY L. PITMAN.

Witnesses:
CATHERINE A. NEWELL,
EDITH B. LIBBEY.